3,845,212
BIOSTAT AND PAINT COMPOSITION

Daniel J. Yovich, Kankakee, John L. Stout, Orland Park, and Ralph E. Tribbey, Kankakee, Ill., assignors to Kankakee Paint Manufacturing Company, Inc.
No Drawing. Filed Mar. 17, 1972, Ser. No. 235,834
Int. Cl. C09d 5/14
U.S. Cl. 424—270                                                 1 Claim

ABSTRACT OF THE DISCLOSURE

A synergistic fungistatic-bacteriostatic mixture of .02 to 10 weight percent of a combination of 2-(4-thiazolyl)-benzimidazole and benzyl bromoacetate and a coating or paint composition containing the same.

BACKGROUND OF THE INVENTION

Field of the Invention

This invention relates to biostatic; i.e., fungistatic and bacteriostatic, coating compositions, and more particularly relates to paint compositions exhibiting fungistatic and bacteriostatic activities in their applied and dried form.

BRIEF DESCRIPTION OF THE PROBLEM AND PRIOR ART

Toys, furniture and other surfaces covered by paints containing lead and mercury present health hazards especially with respect to children who often contact such surfaces with their mouths. Further, the washing of such surfaces can remove lead and mercury compounds which then create water pollution problems. Even air pollution problems can be encountered during drying of paints immediately after they are applied.

Biostatic paints have previously been proposed but many of them are ineffective in their intended use. Others contain mercury, lead and other toxic materials at levels rendering them unsafe.

SUMMARY OF THE INVENTION

The present invention provides a biostatic composition which is particularly suited for use in coating compositions such as paint. The biostatic combination exhibits synergistic fungistatic and bacteriostatic activity and contains as its active ingredients benzyl bromoacetate and 2-(4-thiazolyl)-benzimidazole in a weight ratio between 1:10 and 10:1. The coating composition also contains a conventional film forming polymer and a liquid carrier and when compounded as a paint contains other ingredients normally used in paints such as pigments, freeze depressants, foam depressants, etc.

DESCRIPTION OF THE PREFERRED EMBODIMENT

The fungistatic-bacteriostatic combination of the present invention is a synergistic mixture of two active ingredients; i.e., 2-(4-thiazolyl)-benzimidazole and benzyl bromoacetate. In the preferred compositions the two active ingredients are present in a weight ratio of about 1:3 to about 3:1. The combination is especially intended for use in coating compositions in the presence of a liquid carrier and a film forming polymer soluble in the carrier. The liquid carrier is one which has non-toxic vapors during evaporation and preferably is nonflammable. A particularly preferred carrier is water. The biocidal combination can be present in any amount desired for a particular use although an amount of about .01 or .02 to about 10 weight percent, based on the total coating composition, and more usually 0.05 to 0.5 weight percent will be used.

When the coating composition of the present invention is compounded as a paint, other paint ingredients, which are inert with respect to the benzimidazole and bromoacetate, are included. Examples of such ingredients which are ordinarily used in paint compositions are pigments, surface active agents for dispersing the pigment, antifoaming agents, thickening agents, stabilizers and the like. Additionally, in a water base paint, a freeze point depressant such as propylene glycol is included to prevent or minimize freezing of the composition during shipment or storage. When the paint is compounded as a non-gloss flat paint, flat pigments such as calcium carbonate and/or diatomaceous silica are included in the composition.

The following examples are given by way of illustration of the present invention and are not intended to be limiting thereon.

EXAMPLE 1

The following ingredients were mixed in the amounts indicated and using the mixing procedure set out below:

| Active ingredients: | Percent of each by weight |
|---|---|
| 2-(4-thiazolyl)-benzimidazole (Metasol TK100 from the Merck Chemical Co.) | .10 |
| Benzyl bromoacetate (Merbac 35 from the Merck Chemical Co.) | .10 |
| Inert ingredients: | |
| Water | 38 50 |
| Propylene glycol | 9.10 |
| Hydroxyethyl cellulose | .20 |
| Potassium tripolyphosphate | .10 |
| Titanium dioxide | 22.90 |
| 1-butoxyethoxy - 2 - propanol (Proposol BEP Film Former) | .90 |
| Alkylphenyl-hydroxypolyoxyethylene (Tergitol NPX) | .40 |
| CEE–5 Conjugated Epoxy Ester Emulsion [1] (from Pacific Vegetable Oil Co.) | 2.70 |
| High molecular weight vinyl acetate/butyl acrylate polymer (AMSCO RES 3011 or UCAR Latex 360) | 24.30 |
| Defoamer L–475 (from Drew Chemical Corp.) | .70 |

[1] An ester of a combination of hydroxy terminated Bisphenol-A type epichlorohydrin resin and fatty acid which has been conjugated *in situ* and in which weight ratio of epoxy resin to fatty acid is about one to one. The emulsion is about 60 parts by weight of the ester and 35 parts by weight of water using non-ionic wetting agents and contains conventional dryers.

A high speed agitator mixer was used to mix the above ingredients. The water, propylene glycol, potassium tripolyphosphate, hydroxyethyl cellulose, Merbac 35 and one-half of the Defoamer L–475 were added to the mixer and the Tergitol was then added and the ingredients were stirred for 15 minutes at high speed. The mixing was discontinued and the titanium dioxide and Metasol TK100 were then added and the ingredients were again agitated for 15 minutes at high speed. Again, mixing was discontinued and the AMSCO Resin 3011 was added followed by the Conjugated Epoxy Ester Emulsion and the Proposol BEP Film Former and the remainder of the Defoamer L–475. The ingredients were then stirred slowly for 15 minutes until completely blended and homogeneous. The paint was a white semi-gloss paint.

EXAMPLE 2

Another paint composition was prepared using the formulation and procedure as set out in Example 1 except that ten parts by weight calcium carbonate and two parts by weight diatomaceous silica, each based on 100 parts by weight of the total of the remainder of the composition as set out in the above table, were added at the time the titanium dioxide was added. The resulting paint was a flat white paint composition.

The paint composition of Example 1 was submitted to an independent laboratory for the purpose of determining its bacteriostatic properties and mildew resistance properties. The laboratory compared these properties with those of a commercial bacteriostat-fungistat paint which the laboratory selected for use as a control.

Mildew resistance test

Purpose.—To determine the mildew resistance properties of two latex paints.

Identity of Samples.—The two latex paints were the paint composition of Example 1 and the control paint composition.

Test Method.—The method conformed to Federal Test Method Standard No. 141a, Method 6271.1, for determining the resistance of organic coating material films to the deleterious and degradative action of fungus growth. One coat of the test paints was applied to each side of a sheet of Whatman No. 30 filter paper. A 24 hour dry time was allowed between coats. Following a 48 hour air dry time, the test paints were cut into 1½" square specimens upon which was drawn a ⅛" guideline from the edge of each square. The cut samples were placed on the surface of mineral salts agar petri plates. The agar composition conformed to that specified in Method 6271.1. The paint specimens and surrounding culture medium were inoculated with spore suspensions of six different fungi. Each paint was tested in triplicate against each of the six fungi. The test fungi were *Pullularia pullulans* ATCC 9348, *Penicillium luteum* ATCC 10466, *Aspergillus niger* ATCC 6275, *Trichoderma viride* ATCC 8675, *Aspergillus oryzae* ATCC 10196, and *Penicillium expansum* IPC 126. All petri plates were incubated for 7 days at 30° C. and 90% relative humidity. Paint samples were checked visually and microscopically for the presence or absence of fungal growth.

Summary.—The Example 1 latex paint demonstrated excellent mildew resistance against all six test fungi. A zone of inhibition was present in all test samples against all six fungi. The control latex paint exhibited severe mildew growth with all test fungi. The following Table I reports the results of the test:

TABLE I.—MILDEW RESISTANCE PERFORMANCE OF TWO LATEX PAINTS

| Test fungi | Results of test paints | |
|---|---|---|
| | Control | Example 1 |
| *Pullularia pullulans* | Fail | Pass. |
| *Penicillium luteum* | do | Do. |
| *Aspergillus niger* | do | Do. |
| *Trichoderma viride* | do | Do. |
| *Aspergillus oryzae* | do | Do. |
| *Penicillium expansum* | do | Do. |

Legend:
Fail equals heavy fungal growth on test specimens.
Pass equals no fungal growth on test specimens; zone of inhibition present.

Bacteriostatic property test

Purpose.—To determine the bacteriostatic properties of two latex paints.

Identity of Samples.—The two latex paints again were the paint compositions of Example 1 and the control.

Test Method.—The two test paints were brushed one coat on square glass cover slips and were air dried for 48 hours. The painted cover slips were then placed in an inverted position on seeded Tryptone Glucose Extract agar (Difco) petri plates. Each paint was tested in triplicate against the two bacteria *Staphylococcus aureas* ATCC 6538 and *Pseudomonas aeruginosa* ATCC 10145. The agar petri plates were seeded by inoculating 1.5 ml. of 24 hour broth cultures of bacteria in 150 ml. of Tryptone Glucose Extract agar. The seeded agar plates containing the inverted painted cover slips were incubated for 24 hours at 30° C. and 90% relative humidity. Zone of inhibition was measured in mm. and recorded in Table II:

TABLE II.—BACTERIOSTATIC PROPERTIES OF TWO LATEX PAINTS

| | Results measured as zones of inhibition against bacteria (mm.) | |
|---|---|---|
| Sample identity | *Staphylococcus aureus* | *Pseudomonas aeruginosa* |
| Control | 0 | 0 |
| Example 1 | 6 | 2 |

Summary.—The latex paint identified as Example 1 exhibited zone of inhibition against both *Staphylococcus aureus* ATCC 6438 and *Pseudomonas aeruginosa* ATCC 10145. Example 1 is considered to be bacteriostatic. The latex paint identified as Control showed an absence of inhibitory zones and was considered not to be bacteriostatic.

The paint compositions of the present invention contain no lead, mercury or other toxic heavy metal listed in American National Standard Institute Specification Z66.1–1964 and can be used safely on all surfaces available to children. In the preferred form the paint also conforms with all known air and water pollution regulations including Los Angeles Rule 66 and San Francisco's Regulation No. 3. Also, in the preferred form the paint contains no organic solvents, i.e., is water based, thereby eliminating flash fire hazards during application. Factory Mutual Research tests of the paint of Example 1 in accordance with ASTM Standard Text E-84 yielded the following data:

Flame spread _____ 0
Fuel contribution _____ 0
Smoke development _____ 0

The paint composition can be used in all applications where smoke development could be hazardous or fatal such as in fire stairways and exists, ship interiors and like installations. The composition of Example 1 has also been tested and approved for institutional purchase by fire marshalls in many states.

Weather exposure tests using the paint Example 1 demonstrated that the chemical resistance of the composition is similar to top quality alkyd resin finishes. An outstanding feature of the paint is its sufide stain resistance which was established by testing in actual steel mill exposure. The paint can be used indoors and outdoors and tenaciously bonds to many substrate materials such as wood, ferrous and non-ferrous metals, plastics, plaster, dry wall, ceramic, tile, masonry and previously painted surfaces. Because the composition is an antistatic paint it is not affected by ultra-violet degradation.

The preferred paint composition has no objectionable paint odor. Once the paint has dried it can be steam cleaned, is detergent safe and has unusually good soil, dirt and stain resistance. Both flat and semi-gloss finishes have demonstrated excellent burnish resistance and either can be used for interior or exterior application. The preferred water base paint should be protected against freezing when possible although freeze-thaw tests show that the paint composition can withstand at least five freeze-thaw cycles without adverse affect.

All percentages given herein are weight percentages unless otherwise indicated.

What is claimed is:

1. A synergistic bacteriostatic-fungistatic combination comprising a mixture of 2-(4-thiazolyl)-benzimidazole and benzyl bromoacetate in approximately equal amounts by weight.

References Cited

UNITED STATES PATENTS

| | | | |
|---|---|---|---|
| 2,842,441 | 7/1958 | Kuch | 99—48 |
| 3,347,805 | 10/1967 | Scatena et al. | 260—17 |
| 3,449,271 | 6/1969 | O'Connor et al. | 260—17 |
| 3,483,148 | 12/1969 | Desmarais | 260—17 |
| 3,547,847 | 12/1970 | Levine et al. | 260—22 |

Chem. Abstracts, Index, Vol. 66, p. 424s (1967).

Chem. Abstr. 66, 45591x (1967).

Harding et al., Plant Disease Reporter 51, 51–53 (1967).

WILLIAM H. SHORT, Primary Examiner

E. A. NIELSEN, Assistant Examiner

U.S. Cl. X.R.

106—15 AF; 260—13 R, 17 R, 22 EP, 45.8 N, 45.85; 424—311